(12) United States Patent
Kraus (10) Patent No.: US 11,980,135 B2
(45) Date of Patent: May 14, 2024

(54) METHOD AND SYSTEM FOR HARVESTING, PACKAGING, AND TRACKING CROP MATERIAL

(71) Applicant: DEERE & COMPANY, Moline, IL (US)

(72) Inventor: Timothy J. Kraus, Blakesburg, IA (US)

(73) Assignee: DEERE & COMPANY, Moline, IL (US)

(*) Notice: Subject to any disclaimer, the term of this patent is extended or adjusted under 35 U.S.C. 154(b) by 672 days.

(21) Appl. No.: 17/166,727

(22) Filed: Feb. 3, 2021

(65) Prior Publication Data
US 2022/0240452 A1 Aug. 4, 2022

(51) Int. Cl.
| | |
|---|---|
| A01D 91/04 | (2006.01) |
| A01F 15/08 | (2006.01) |
| G06T 7/70 | (2017.01) |
| G06V 20/10 | (2022.01) |
| G06V 20/56 | (2022.01) |
| H04N 23/54 | (2023.01) |

(52) U.S. Cl.
CPC ............. *A01D 91/04* (2013.01); *A01F 15/08* (2013.01); *G06T 7/70* (2017.01); *G06V 20/188* (2022.01); *G06V 20/56* (2022.01); *H04N 23/54* (2023.01); *G06T 2207/30188* (2013.01)

(58) Field of Classification Search
CPC .................... A01D 91/04; A01F 15/08; G06T 2207/30188
See application file for complete search history.

(56) References Cited

U.S. PATENT DOCUMENTS

| | | | |
|---|---|---|---|
| 7,877,970 B1 | 2/2011 | Crosby | |
| 2009/0107349 A1* | 4/2009 | Noonan | A01F 15/071 40/305 |
| 2015/0310323 A1 | 10/2015 | Foster et al. | |
| 2018/0116124 A1* | 5/2018 | Murray | A01B 69/008 |
| 2019/0246549 A1* | 8/2019 | Peters | G05D 1/0274 |

(Continued)

FOREIGN PATENT DOCUMENTS

EP 1943877 B1 4/2013

OTHER PUBLICATIONS

Extended European Search Report and Written Opinion issued in European Patent Application No. 22154412.5, dated Jul. 15, 2022, in 09 pages.

*Primary Examiner* — Abigail A Risic (57) ABSTRACT

A method of harvesting crop material includes capturing an image of a plurality of regions 28 of a field 50. The respective image of the regions 28 is analyzed to determine data related to constituent species of the crop material located within each of the regions 28. The data is associated with a region identifier 48 assigned to the respective one of the regions 28, and saved in a memory 42 of a computing device 30. The crop material in the field 50 is then harvested and formed into a bale. The harvested crop material formed into the bale is gathered from a subset 46 of the regions 28. A region identifier 48 of each of the regions 28 included in the subset 46 of the regions 28 is associated with the bale identifier 38, such that the data related to constituent species of the crop material included in the bale is associated with the bale and may be obtained by querying the computing device 30.

16 Claims, 2 Drawing Sheets

(56) References Cited

U.S. PATENT DOCUMENTS

2019/0294914 A1* 9/2019 Fevold .................... G06T 7/593
2021/0195827 A1* 7/2021 Zhou .................... A01B 79/005
2021/0240965 A1   8/2021 Yadav et al.
2023/0000015 A1* 1/2023 Herrmann ............ A01D 41/141

* cited by examiner

FIG. 1

FIG. 2

METHOD AND SYSTEM FOR HARVESTING, PACKAGING, AND TRACKING CROP MATERIAL

TECHNICAL FIELD

The disclosure generally relates to a method of harvesting, packaging, and tracking crop material, and a system therefor.

BACKGROUND

Historically, producers of forage crop material for animals have grown fields of single, mono-culture crop material, such as but not limited to, alfalfa. More recently, producers have begun planting fields of mixed or multiple-culture crop materials, such as but not limited to combinations of alfalfa and grass. These mixed stands of multiple crop materials may provide advantages over mono-culture crop materials, such as but not limited to, better fiber digestion by the animal, reduced fertilizer requirements, and less strain on the soil.

While stands of mixed crop materials may provide benefits to some producers, different animals may require different feed rations of the different crop materials. Additionally, some crop materials or weed species may be poisonous to some animals. Accordingly, it is important for a producer to know the content of the feed material so that the feed ration may be optimized for the animal, and any harmful feed materials may be avoided.

Often, the crop material is harvested and formed into a bale. While a producer may be able to visually identify different crop material species while the crop material is standing in a field, it is difficult to identify the different species of crop material once formed into a bale, and even more difficult to determine the different quantities of the different crop material species when formed into a bale.

SUMMARY

A method of harvesting crop material in a field is provided. The method includes capturing an image of each of a plurality of regions of the field with an image sensor. A region identifier is assigned to each of the plurality of regions with a computing device. The respective image of each of the plurality of regions is analyzed with the computing device to determine data related to constituent species of the crop material located within each of the plurality of regions. The data related to constituent species for each respective one of the plurality of regions is associated with the region identifier assigned to the respective one of the plurality of regions with the computing device, and saved in a memory of the computing device. The crop material in the field is then harvested with a harvester implement and formed into a bale with a baler implement. The harvested crop material formed into the bale is gathered from a subset of the plurality of regions. A bale identifier is attached to the bale with the baler implement. The computing device may then identify which of the plurality of regions is included in the subset of the plurality of regions, and associate the region identifier of each of the plurality of regions included in the subset of the plurality of regions with the bale identifier, such that the data related to constituent species of the crop material included in the bale is associated with the bale and may be obtained by querying the computing device.

In one aspect of the disclosure, the method of harvesting the crop material includes saving the region identifier for each of the plurality of regions, the data related to constituent species for each respective one of the plurality of regions, and the bale identifier associated with the region identifier of each of the plurality of regions included in the subset of the plurality of regions in a memory. The memory may be part of the computing device and located on the harvester implement and/or the baler implement, or may be remotely located at a centralized or cloud based storage facility.

In one aspect of the disclosure, the method of harvesting the crop material includes segmenting the field into the plurality of regions with the computing device. The field may be segmented into the different regions in any manner. In one implementation, the different regions are sized and arranged to provide discrete portions of the bale, such as a single flake of a square bale. In other implementations, the different regions may be sized and arranged to provide discrete portions of a round bale. Additionally, the field may be segmented into generally rectangular regions aligned along a harvest path.

In one aspect of the disclosure, the method of harvesting the crop material includes defining a geographic boundary of each of the plurality of regions. The geographic boundary of each of the plurality of regions may be defined in a suitable manner, such as by a latitude and a longitude for reach respective region, an absolute coordinate of each respective region, etc. The geographic boundary may include a coordinate for a centralized location, and dimension descriptions describing the regions relative to the centralized location. The geographic boundary of each respective region may be defined and saved in the memory of the computing device so that the location of the crop material from each respective region may be tracked.

In one aspect of the disclosure, the method of harvesting the crop material may include tracking a geographic location of the crop material within each respective one of the plurality of regions after harvesting the crop material. For example, if the crop material is moved after harvesting and before being formed into the bale, the crop material may be moved, e.g., raked or combined with other crop material. By knowing the geographic boundary of each respective region, the movement of the crop material may be tracked so that the location of the crop material may be known.

In one aspect of the disclosure, the method of harvesting the crop material includes the crop material harvested from at least two different regions of the field may be combined into a windrow. If the crop material from two different regions is combined, then the computing device may track the movement and location of the crop material from each.

In one aspect of the disclosure, the method of harvesting the crop material includes communicating the image of each of the plurality of regions to the computing device. The computing device may be located remote from the image sensor. The computing device is configured to receive the images from the image sensor for each of the respective regions of the field.

In one aspect of the disclosure, the method of harvesting the crop material includes analyzing the respective image of each of the plurality of regions to determine data related to constituent species of the crop material located within each of the plurality of regions includes identifying at least one crop species and a percentage of the at least one crop species included in a total quantity of the crop material located within the respective region. Additionally, the data related to the constituent species of the crop material may include, but is not limited to, type and percentage of weeds, stage of growth of the different crop species, crop quality metrics such as but not limited to non-digestible fiber content, acid detergent fiber content, neutral detergent fiber content, crude protein content, etc.

In one implementation of the disclosure, the image sensor is mounted on the harvester implement and positioned to capture images immediately ahead of the harvester implement relative to a direction of travel while harvesting. The plurality of regions may be defined as an area immediately ahead of the harvester implement and the respective image captured as the harvester implement moves through the field. As such, the step of capturing the image of each of the plurality of regions of the field is further defined as capturing the image of each of the plurality of regions of the field as the harvester implement harvests the crop material.

In one implementation of the disclosure, the image sensor is disposed on an aerial device. Capturing the image of each of the plurality of regions of the field includes maneuvering the aerial device over the field prior to harvesting the crop material in the field. The field may be segmented into the plurality of regions and their respective boundaries defined and saved into a memory of the aerial device. The aerial device may then be flown over the field and capture the respective images of the regions based on the location of the aerial device.

In one aspect of the disclosure, the method of harvesting the crop material includes associating a respective geographic location of each respective one of the plurality of regions of the field with the image of each respective one of the plurality of regions of the field. The image and the associated region may then be saved in the memory of the computing device.

A harvesting system for harvesting crop material in a field is also provided. The harvesting system includes an image sensor operable to capture a respective image of each of a plurality of regions of the field, harvester implement operable to harvest the crop material within the field, and a baler implement operable to gather the harvested crop material and form the crop material into a bale. The baler implement is further operable to attach a bale identifier to each respective bale during formation of the bale. A computing device includes a processor and a memory having a harvesting algorithm stored thereon. The processor is operable to execute the harvesting algorithm to receive an image of each of the plurality of regions of the field from the image sensor, and assign a region identifier to each of the plurality of regions. The computing device may then analyze the respective image of each of the plurality of regions to determine data related to constituent species of the crop material located within each of the plurality of regions, and associate the data related to constituent species for each respective one of the plurality of regions with the region identifier assigned to the respective one of the plurality of regions. The harvester implement may be controlled to harvest the crop material in the field, and the baler implement may be controlled to form the harvested crop material gathered from a subset of the plurality of regions into a bale, and attach the bale identifier to the bale. The computing device may then identify which of the plurality of regions is included in the subset of the plurality of regions, and associate the region identifier of each of the plurality of regions included in the subset of the plurality of regions with the bale identifier such that the data related to constituent species of the crop material included in the bale is associated with the bale and may be obtained by querying the computing device.

In one aspect of the harvesting system, the processor is operable to execute the harvesting algorithm to segment the field into the plurality of regions and determine a geographic boundary of each of the plurality of regions. In one aspect of the harvesting system, the processor is operable to execute the harvesting algorithm to associate a respective geographic location of each respective one of the plurality of regions of the field with the image of each respective one of the plurality of regions of the field.

In one aspect of the harvesting system, the processor is operable to execute the harvesting algorithm to track a geographic location of the crop material within each respective one of the plurality of regions after the crop material has been harvested.

The harvesting system and the method of harvesting the crop material described above identify and track the different constituent crop species in the field. The image of each respective region may be analyzed to determine or identify the different crop species, their respective percentages of the crop material in the region, as well as other data related to the crop materials. The data related to the crop materials from a respective region is associated with the region identifier of that respective region and saved in the memory of the computing device. By doing so, the crop data for each specific region is known. As the crop material is handled in the future, the location of the crop material from each specific region may be tracked. For example, if alfalfa is moved or combined with crop material from another region, the computing device may track the location of the crop material. The baler implement may also access this data so that the baler implement knows the data related to the crop materials being gathered and formed into a specific bale. The computing device may then assign or associate the bale identifier with the region identifier, thereby linking the data related to the crop material to the bale identifier. An end user may access the data related to the constituent crop materials included in a specific bale at a future time by referencing the bale identifier, thereby learning the content of that specific bale and enabling the end user to properly establish a feed ration for their specific purpose.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Referring to the Figures, wherein like numerals indicate like parts throughout the several views, a harvesting system is generally shown at 20. In the example implementation shown in the Figures and described herein, the harvesting system 20 includes an image sensor 22, a harvester implement 24, and a baler implement 26. The harvesting system 20 is configured for identifying constituent crop species of standing crop material 54 in a field 50, and tracking the identified constituent crop species through the harvesting and baling process, such that an end user may learn or obtain the crop species, and potentially other data related to the cop species, included in each bale 36 of crop material 56 harvested from the field 50.

The image sensor 22 is operable to capture an image of a plurality of regions 28 of the field 50. In one implementation, the image sensor 22 captures a respective image for each respective region 28 of the field 50. In another implementation, the image sensor 22 captures an image including more than one region 28 of the field 50.

The image sensor 22 may include any device capable of capturing an image and communicating the image to a computing device 30. The image sensor 22 may include, but is not limited to, a camera, a video camera, etc. The image sensor 22 may capture the image in a suitable light spectrum. In one implementation, the image sensor 22 is operable to capture the image in a Near InfraRed (NIR) light spectrum as understood by those skilled in the art. The specific type, components, function, etc. of the image sensor 22 are understood by those skilled in the art and are therefore not described in greater detail herein.

Figure 1:
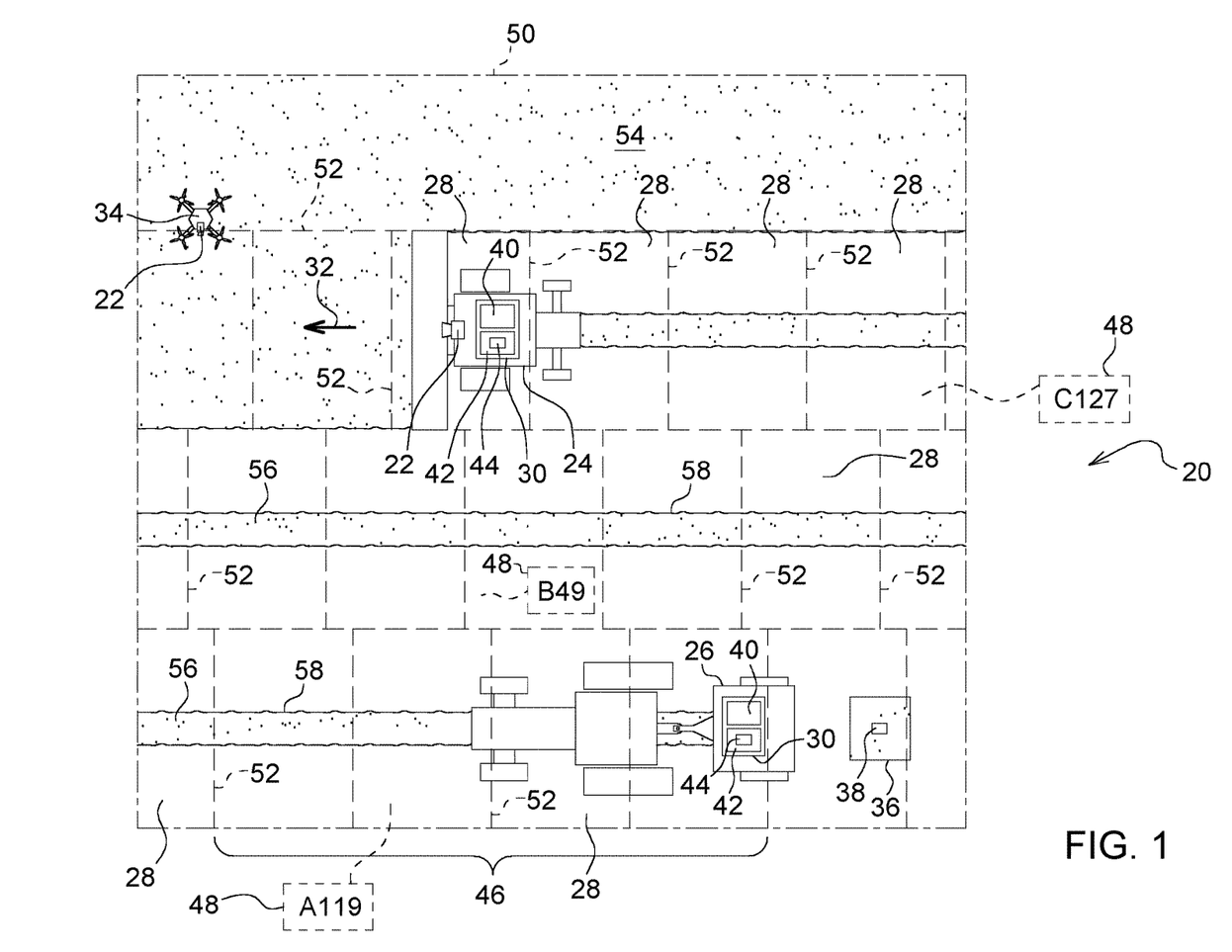
FIG. 1 is a schematic plan view of a harvesting system.

In one implementation, as shown in FIG. 1, the image sensor 22 is mounted on the harvester implement 24. The image sensor 22 may be positioned to capture an image in front of the harvester implement 24 relative to a direction of travel 32 of the harvester implement 24 when harvesting the crop material 54 from the field 50. As noted above, the field 50 may be segmented into discrete regions 28 for species identification and tracking. For example, the field 50 may be segmented into regions 28 corresponding to a width approximately equal to a width of the harvester implement 24. As such, the image sensor 22 may be configured to capture the image of each of the regions 28 of the field 50 as the harvester implement 24 harvests the crop material 54 from the field 50. In this manner, the regions 28 of the field 50 may be defined simultaneously while capturing the respective images. In other words, the image sensor 22 may capture an image ahead of the harvester implement 24 while harvesting, and then define the boundary and location of the region 28 of the field 50 from which that respective image was captured, thereby defining that region 28 of the field 50. This process may be followed for the entire field 50.

In another implementation, the image sensor 22 may be disposed on an aerial device 34. The aerial device 34 may include an unmanned aerial device 34, such as but not limited to an aerial drone or satellite. In other implementations, the aerial device 34 may include a manned aerial device 34, such as but not limited to a plane or a helicopter. The aerial device 34 may be maneuvered over the field 50 prior to harvesting the crop material 54 in the field 50 in order to capture the image for each respective region 28 of the field 50. In this implementation, the boundary and location of each of the plurality of regions 28 may be defined prior to flying the aerial device 34 over the field 50. The aerial device 34 may then capture an image of each predefined region 28 of the field 50. It should be appreciated that the harvesting system 20 may include multiple image sensors 22. For example, the harvesting system 20 may include both an image sensor 22 mounted on the harvester implement 24, and another image sensor 22 mounted on the aerial device 34.

The harvester implement 24 is operable to harvest the crop material 54 within the field 50. The crop material may include, but is not limited to, grasses, alfalfa, small grains, corn, other forage crops suitable for animal feed, etc. The type, configuration, operation, etc. of the harvester implement 24 is dependent upon the specific type of crop being harvested. The harvester implement 24 may include, but is not limited to, a self-propelled windrower, a tractor pulling and/or pushing a mower or a mower conditioner, a forage harvester, a combine, etc. In one implementation, the harvester implement 24 cuts the standing crop material in the field 50 and moves the cut crop material into a windrow 58. The specific type and/or configuration of the harvester implement 24 for the specific crop material to be harvested are known to those skilled in the art, are not pertinent to the teachings of this disclosure other than as described herein, and are therefore not described in greater detail.

The baler implement 26 is operable to gather the harvested crop material 56 after the crop material has been cut by the harvester implement 24 and form the crop material into a bale 36. In some implementations, the baler implement 26 may be configured to form the bale 36 to include a parallelepiped shape, such as but not limited to, a large square baler or a small square baler. In other implementations, the baler implement 26 may be configured to form the bale 36 to include a cylindrical shape, such as but not limited to a round baler. The type and configuration of the baler implement 26 are known to those skilled in the art, are not pertinent to the teachings of this disclosure other than as described herein, and are therefore not described in greater detail.

The baler implement 26 may include a bale identification system that is operable to attach a bale identifier 38 to each respective bale 36 during formation of the bale 36. The bale identifier 38 may include, but is not limited to, a Radio Frequency Identification (RFID) device, a label, etc. The bale identifier 38 may include any device capable of being associated with and identifying a respective bale 36. The bale identifier 38 may be attached to the bale 36 during formation with the baler implement 26, or subsequent to formation by some other implement.

In one implementation, the bale identifier 38 includes a RFID tag attached to the bale 36 during formation. The RFID tag includes a unique identification code that may be read by a RFID reader. As understood by those skilled in the art, the RFID reader emits an interrogation signal, to which the RFID tag responds by emitting a signal including the identification code. The identification code may be associated with a specific bale 36, and reference to identify that specific bale 36 and any properties or characteristics associated with that specific bale 36. The configuration and operation of RFID reader/tag systems are known to those skilled in the art, are not pertinent to the teachings of this disclosure other than as described herein and are therefore not described in greater detail.

As noted above, the image sensor 22 is in communication with the computing device 30. The computing device 30 is operable to receive image signals from the image sensor 22. While the computing device 30 is generally described herein as a singular device, it should be appreciated that the computing device 30 may include multiple devices linked together to share and/or communicate information therebetween. Furthermore, it should be appreciated that the computing device 30 may be located on the harvester implement 24, the baler implement 26, located remotely from the harvester implement 24 and baler implement 26, or be located in a combination of the harvester implement 24, the baler implement 26, and a remote location.

The computing device 30 may alternatively be referred to as a computer, a controller, a control unit, a control module, a module, etc. The computing device 30 includes a processor 40, a memory 42, and all software, hardware, algorithms, connections, sensors, etc., necessary to identify and track data related to the constituent crop species in the field 50. As such, a method may be embodied as a program or algorithm operable on the computing device 30. It should be appreciated that the computing device 30 may include any device capable of analyzing data from various sensors, comparing data, making decisions, and executing the required tasks.

As used herein, "computing device 30" is intended to be used consistent with how the term is used by a person of skill in the art, and refers to a computing component with processing, memory, and communication capabilities, which is utilized to execute instructions (i.e., stored on the memory or received via the communication capabilities) to control or communicate with one or more other components. In certain embodiments, the computing device 30 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The computing device 30 may be in communication with other components on the baler implement 26 and/or the image sensor 22, such as hydraulic components, electrical components, and operator inputs within an operator station of an associated work vehicle. The computing device 30 may be electrically connected to these other components by a wiring harness such that messages, commands, and electrical power may be transmitted between the computing device 30 and the other components. Although the computing device 30 is referenced in the singular, in alternative embodiments the configuration and functionality described herein can be split across multiple devices using techniques known to a person of ordinary skill in the art.

The computing device 30 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 42 may include any non-transitory/tangible medium which participates in providing data or computer-readable instructions. The memory 42 may be non-volatile or volatile. Non-volatile media may include, for example, optical or magnetic disks and other persistent memory. Example volatile media may include dynamic random access memory (DRAM), which may constitute a main memory. Other examples of embodiments for memory 42 include a floppy, flexible disk, or hard disk, magnetic tape or other magnetic medium, a CD-ROM, DVD, and/or any other optical medium, as well as other possible memory devices such as flash memory.

The computing device 30 includes the tangible, non-transitory memory 42 on which are recorded computer-executable instructions, including a harvesting algorithm 44. The processor 40 of the computing device 30 is configured for executing the harvesting algorithm 44. The harvesting algorithm 44 implements a method of harvesting crop material in the field 50, including identifying and tracking data related to the constituent crop species of the crop material, described in detail below.

Figure 2:
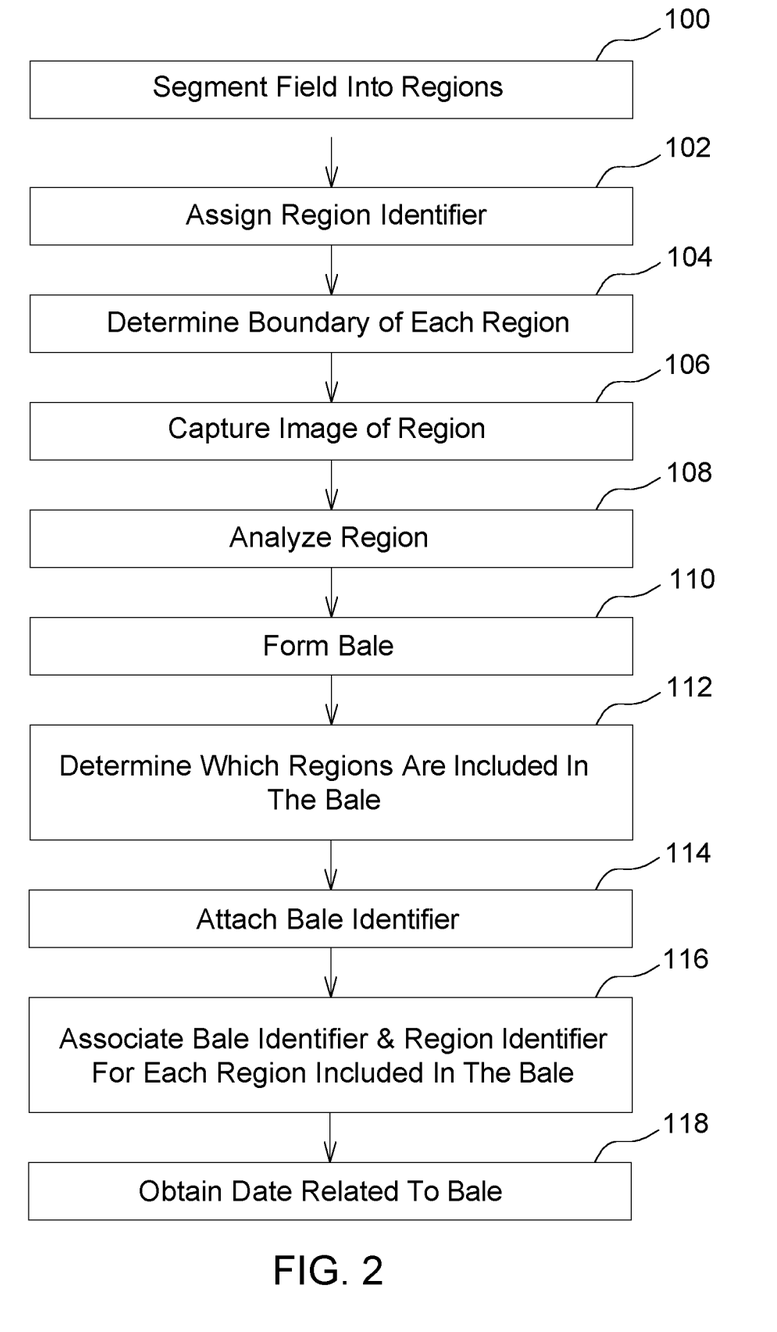
FIG. 2 is a flowchart representing a method of harvesting crop material.

Referring also to FIG. 2, the method includes segmenting the field 50 into the plurality of regions 28. The step of segmenting the field 50 into the regions 28 is generally indicated by box 100 in FIG. 2. Each region 28 includes a discrete area of the field 50 in which the different crop species of the crop material may be identified and tracked. As described above, each region 28 may be segmented and defined prior to harvesting the crop material with the harvester implement 24. Segmentation of the field 50 into the respective regions 28 may occur simultaneously while capturing images of the field 50, or may occur prior to capturing images of the field 50.

The computing device 30 may assign a region identifier 48 to each of the regions 28. The step of assigning the respective region identifier 48 to the respective region 28 is generally indicated by box 102 in FIG. 2. The region identifier 48 for each respective region 28 may include, but is not limited to, an alpha-numeric descriptor that is unique to that region 28. In other words, each specific region 28 includes it's own unique region identifier 48. The region identifier 48 may be considered a name used to track that specific region 28.

The computing device 30 may determine and/or define a geographic boundary 52 of each of the regions 28. The step of determining the geographic boundary 52 of each of the regions 28 is generally indicated by box 104 in FIG. 2. The geographic boundary 52 may de defined in a suitable manner enabling or describing the geographic location of the region 28 within the field 50. The geographic boundary 52 may include, but is not limited to, coordinates, distances, bearings, or other descriptors describing the geographic boundary 52 of each region 28. The geographic boundary 52 of each region 28 may then be saved in the memory 42 of the computing device 30. The geographic boundary 52 of each region 28 may be defined in a suitable manner understood by those skilled in the art. For example, a Global Positioning Satellite (GPS) system, global coordinates, lidar, radar, etc. may be used as understood by those skilled in the art to identify the geographic boundary 52 of each region 28.

An image of each of a plurality of regions 28 of the field 50 may then be captured or sensed and communicated to the computing device 30. The step of capturing the image of the regions is generally indicated by box 106 in FIG. 2. The image may include a single image including all of the respective regions 28 of the field 50, or may include multiple images. In one implementation, a respective image is captured for each respective region 28 of the field 50. In another implementation, an image is captured including multiple regions 28 of the field 50. The image may be captured to show the different crop species in enough detail for the computing device 30 to identify the different crop species, and potentially other data related to the different constituent crop species of the crop material. The resolution of the image and the size of each of the regions 28 may be coordinated and/or dependent upon the other. For example, the size or area of each region 28 may be dependent upon the resolution of the image sensor 22.

The computing device 30 is operable to receive the image of each of the regions 28 of the field 50 from the image sensor 22. The computing device 30 may be connected to the image sensor 22 through either a wired connection and/or a wireless connection as is understood by those skilled in the art. The computing device 30 may associate each image with a respective one of the regions 28, the region identifier 48, and/or the respective geographic location or boundary of that region 28 of the field 50, and save the same in the memory 42.

The computing device 30 may then analyze the respective image of each of the plurality of regions 28 to determine data related to constituent species of the crop material located within each of the plurality of regions 28. The step of analyzing the images to determine the data related to the crop material is generally indicated by box 108 in FIG. 2. As used herein, the constituent species of the crop material include the different species of plants existing in the field 50 and/or region 28. For example, in a field 50 planted with alfalfa and grass, the constituent crop species may include alfalfa, grass, and one or more other plant species. The other plant species may include, for example, one or more weed species. The data related to the constituent species may include a list of the different plant species, a percentage of an entire quantity of each different plant species, a stage of growth of each plant species, a crop quality and/or nutritional metric, etc. The computing device 30 determines the data related to the constituent species for each individual region 28 of the field 50, associates that data with the respective region 28 and/or region identifier 48 assigned to the respective region 28, and may save all of the same in the memory 42.

The crop material in the field 50 may then be harvested with the harvester implement 24. As noted above, the operation of the harvester implement 24 depends upon the specific crop material being harvested. For example, if the crop material is hay and forage crop, then the harvester implement 24 may include a self-propelled windrower, and harvesting the crop material may include cutting the crop material in the field 50 and forming the crop material into a windrow 58. It should be appreciated that the process of harvesting the crop material may differ from the example implementation described herein.

The computing device 30 may track a geographic location of the crop material within each respective one of the regions 28 after the crop material has been harvested. For example, if the harvesting operation includes multiple processes that may cause the crop material to move within its respective region 28, or to combine crop material from at least two different and/or adjoining regions 28, then the computing device 30 may track the location of the crop material from each region 28. For example, if the crop material includes hay and forage material, and the harvesting process includes cutting and forming the crop material into a windrow 58, a subsequent harvesting process may include raking adjacent windrows 58 together and/or moving one windrow 58. Because the computing device 30 knows the location of each region 28, the computing device 30 may track the location of crop material within that region 28 based on any subsequent harvesting processes. As such, the computing device 30 may know the location of the crop material from the image of respective region 28 and track the location of that crop material during subsequent harvesting processes to maintain knowledge of the location of that crop material.

The harvested crop material from a subset 46 of the plurality of regions 28 may then be gathered and formed into a bale 36 with the baler implement 26. Forming the harvested crop material 56 into the bale 36 is generally indicated by box 110 in FIG. 2. The subset 46 of the regions 28 may include any number of the regions 28, e.g., 1, 2, 3, 4, . . . , n regions 28. For example, the subset 46 of the regions 28 may include a single region 28, in which case the bale 36 would be formed from the crop material gathered from that single region 28. In another example, the subset 46 of the regions 28 may include four different regions 28, in which case the bale 36 would be formed from the crop material gathered from those four different regions 28.

The computing device 30 may determine and/or identify which of the regions 28 is included in the subset 46 of the regions 28 in a suitable manner. The step of determining which regions 28 are included in the bale 36 is generally indicated by box 112 in FIG. 2. For example, the computing device 30 may use the GPS system to track a location of the baler implement 26 and knowing the location of the baler implement 26, determine which regions 28 are being gathered for that specific bale 36 based on the geographic boundary 52 of the regions 28 saved in the memory 42 and associated with the different regions 28 and region identifier 48s. It should be appreciated that the computing device 30 may determine which regions 28 are included in the subset 46 of regions 28 for each bale 36 in some other manner not described herein.

The bale identifier 38 may be attached to the bale 36. The step of attaching the bale identifier 38 to the bale 36 is generally indicated by box 114 in FIG. 2. In one implementation, the bale identifier 38 may be attached by the bale 36 by the baler implement 26 during formation of the bale 36. In another implementation, the bale identifier 38 may be attached to the bale 36 subsequent to formation of the bale 36, by some other device, implement, and/or process. As noted above, the bale identifier 38 for each respective bale 36 includes an identification code that is unique to that respective bale 36.

The computing device 30 may then associate the region identifier 48 of each of the regions 28 included in the subset 46 of the regions 28 gathered to form the bale 36 with the bale identifier 38. The step of associating the region identifier 48 for each region 28 included in the bale 36 is generally indicated by box 116 in FIG. 2. In so doing, the data related to the constituent species of the crop material included in the that respective bale 36 is associated with that respective bale 36 and may be obtained by querying the computing device 30. In other words, because the data related to the constituent crop species is known for the crop material from each respective region 28 and associated with that respective region identifier 48, by associating the region identifier 48 for each region 28 gathered to form a respective bale 36 with the bale identifier 38 for that respective bale 36, the data related to the constituent species of the crop material is thereby associated with the bale identifier 38.

The computing device 30 may then save the region identifier 48 for each region 28 gathered to form the respective vale and the associated bale identifier 38 in the memory 42. The computing device 30 may communicate this information to a remote memory 42, e.g., a network server and/or a Cloud memory 42 device. An end user may then query the computing device 30 with an identification code, e.g., by scanning the bale identifier 38 of a bale 36. The step of obtaining the data related to the bale is generally indicated b box 118 in FIG. 2. The computing device 30 may then report back the data related to the constituent plant species that are included in that specific bale 36. This enables the end user to determine how best to use the crop material included in that bale 36, such as by combining the crop material with other feed sources and/or feeding that specific bale 36 to only one type of animal. For example, if the data related to the constituent plant species indicates that a specific bale 36 includes horse nettle, which may be poisonous to horses, then the end user may then know that it is unsafe to feed this particular bale 36 to horses.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of harvesting crop material in a field, the method comprising:
    capturing an image of each of a plurality of regions of the field with an image sensor;
    assigning a region identifier to each of the plurality of regions with a computing device;
    analyzing the respective image of each of the plurality of regions, with the computing device, to identify constituent plant species of the crop material located within each of the plurality of regions;
    associating the identified constituent plant species for each respective one of the plurality of regions with the region identifier assigned to the respective one of the plurality of regions, with the computing device;
    harvesting the crop material in the field with a harvester implement;
    forming the harvested crop material gathered from a subset of the plurality of regions into a bale with a baler implement;
    attaching a bale identifier to the bale with the baler implement;
    identifying which of the plurality of regions is included in the subset of the plurality of regions with the computing device; and
    associating the region identifier of each of the plurality of regions included in the subset of the plurality of regions with the bale identifier, with the computing device, such that the constituent plant species of the crop material included in the bale is associated with the bale and may be obtained by querying the computing device.

2. The method set forth in claim 1, further comprising saving the region identifier for each of the plurality of regions, the constituent plant species for each respective one of the plurality of regions, and the bale identifier associated with the region identifier of each of the plurality of regions included in the subset of the plurality of regions in a memory.

3. The method set forth in claim 1, further comprising segmenting the field into the plurality of regions with the computing device.

4. The method set forth in claim 3, further comprising defining a geographic boundary of each of the plurality of regions.

5. The method set forth in claim 4, further comprising tracking a geographic location of the crop material within each respective one of the plurality of regions after harvesting the crop material.

6. The method set forth in claim 5, further comprising combining the crop material harvested from at least two different regions of the field into a windrow.

7. The method set forth in claim 1, further comprising communicating the image of each of the plurality of regions to the computing device.

8. The method set forth in claim 1, wherein analyzing the respective image of each of the plurality of regions to identify constituent plant species of the crop material located within each of the plurality of regions includes identifying at least one crop species and a percentage of the at least one crop species included in a total quantity of the crop material located within the respective region.

9. The method set forth in claim 1, wherein the image sensor is mounted on the harvester implement, and wherein capturing the image of each of the plurality of regions of the field is further defined as capturing the image of each of the plurality of regions of the field as the harvester implement harvests the crop material.

10. The method set forth in claim 1, wherein the image sensor is disposed on an aerial device, and wherein capturing the image of each of the plurality of regions of the field includes maneuvering the aerial device over the field prior to harvesting the crop material in the field.

11. The method set forth in claim 1, further comprising associating a respective geographic location of each respective one of the plurality of regions of the field with the image of each respective one of the plurality of regions of the field.

12. A harvesting system for harvesting crop material in a field, the harvesting system comprising:
    an image sensor operable to capture a respective image of a plurality of regions of the field;
    a harvester implement operable to harvest the crop material within the field;
    a baler implement operable to gather the harvested crop material and form the crop material into a bale, wherein the baler implement attaches a bale identifier to each respective bale during formation of the bale;
    a computing device having a processor and a memory having a harvesting algorithm stored thereon, wherein the processor is operable to execute the harvesting algorithm to:
    receive an image of each of the plurality of regions of the field from the image sensor;
    assign a region identifier to each of the plurality of regions;
    analyze the respective image of each of the plurality of regions to identify constituent plant species of the crop material located within each of the plurality of regions;
    associate the identified constituent plant species for each respective one of the plurality of regions with the region identifier assigned to the respective one of the plurality of regions;

harvest the crop material in the field with the harvester implement;

form the harvested crop material gathered from a subset of the plurality of regions into a bale with the baler implement;

attach the bale identifier to the bale with the baler implement;

identify which of the plurality of regions is included in the subset of the plurality of regions; and associate the region identifier of each of the plurality of regions included in the subset of the plurality of regions with the bale identifier such that the constituent plant species of the crop material included in the bale is associated with the bale and may be obtained by querying the computing device.

13. The harvesting system set forth in claim 12, wherein the processor is operable to execute the harvesting algorithm to segment the field into the plurality of regions.

14. The harvesting system set forth in claim 13, wherein the processor is operable to execute the harvesting algorithm to determine a geographic boundary of each of the plurality of regions.

15. The harvesting system set forth in claim 12, wherein the processor is operable to execute the harvesting algorithm to track a geographic location of the crop material within each respective one of the plurality of regions after the crop material has been harvested.

16. The harvesting system set forth in claim 12, wherein the processor is operable to execute the harvesting algorithm to associate a respective geographic location of each respective one of the plurality of regions of the field with the image of each respective one of the plurality of regions of the field.

* * * * *